US010285218B1

(12) United States Patent
Gaitas et al.

(10) Patent No.: US 10,285,218 B1
(45) Date of Patent: May 7, 2019

(54) DIRECT AND SELECTIVE AREA SYNTHESIS OF GRAPHENE USING MICROHEATER ELEMENTS

(71) Applicants: Angelo Gaitas, Miami, FL (US); Nezih Pala, Fort Lauderdale, FL (US)

(72) Inventors: Angelo Gaitas, Miami, FL (US); Nezih Pala, Fort Lauderdale, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 15/978,461

(22) Filed: May 14, 2018

(51) Int. Cl.
*H05B 3/00* (2006.01)
*H05B 3/40* (2006.01)
*C01B 32/182* (2017.01)
*C01B 32/16* (2017.01)
*C01B 32/05* (2017.01)
*C01B 32/184* (2017.01)
*H05B 3/26* (2006.01)
*H05B 3/14* (2006.01)

(52) U.S. Cl.
CPC .......... *H05B 3/0014* (2013.01); *C01B 32/184* (2017.08); *H05B 3/145* (2013.01); *H05B 3/267* (2013.01)

(58) Field of Classification Search
CPC ....... H05B 3/00–3/0009; H05B 3/0047; H05B 3/40; C01B 32/05; C01B 32/154; C01B 32/16–32/166; C01B 32/182–32/192
See application file for complete search history.

(56) References Cited

U.S. PATENT DOCUMENTS

| | | | |
|---|---|---|---|
| 8,772,181 B2* | 7/2014 | Noda | H01L 29/66742 257/40 |
| 2007/0092432 A1* | 4/2007 | Prud'Homme | B82Y 30/00 423/448 |
| 2007/0101824 A1* | 5/2007 | Drzal | B22F 9/24 75/345 |
| 2007/0111885 A1* | 5/2007 | Li | B01J 23/825 502/325 |
| 2010/0048391 A1* | 2/2010 | Kim | B01J 23/28 502/321 |
| 2010/0074833 A1* | 3/2010 | Nakayama | B01J 23/745 423/447.2 |

(Continued)

OTHER PUBLICATIONS

Alymov et al., "Abrupt current switching in graphene bilayer tunnel transistors enabled by van Hove singularities," Scientific Reports, Apr. 2016, pp. 1-8, vol. 6.

(Continued)

*Primary Examiner* — Michael A Laflame, Jr.
(74) *Attorney, Agent, or Firm* — Saliwanchik, Lloyd & Eisenschenk (57) ABSTRACT

A method of synthesis of graphene can include: depositing a carbon (C) layer on a substrate, for example a substrate comprising a silicon (Si) layer and an oxide ($SiO_2$) layer on the Si layer; depositing a metal layer on the C layer; preparing the substrate including the C layer and the metal layer in a chamber; maintaining a pressure of the chamber under 1 atm, for example under 1 Torr; flowing an inert gas in the chamber; contacting a thermal probe tip on the metal layer; heating the thermal probe tip to a temperature of more than 250° C. such that graphene is formed on the substrate; and etching the substrate. The metal layer can be a tin layer.

13 Claims, 7 Drawing Sheets

(56) References Cited

U.S. PATENT DOCUMENTS

| | | | | |
|---|---|---|---|---|
| 2012/0230908 | A1* | 9/2012 | Ohashi | B82Y 30/00 423/447.3 |
| 2012/0294793 | A1* | 11/2012 | Chen | B82Y 30/00 423/448 |
| 2013/0259763 | A1* | 10/2013 | Kawarada | B01J 19/126 422/186.29 |
| 2014/0001152 | A1* | 1/2014 | Zurutuza Elorza | B82Y 30/00 216/36 |
| 2014/0079623 | A1* | 3/2014 | Jeon | C23C 16/26 423/448 |
| 2014/0178688 | A1* | 6/2014 | Tour | C01B 32/186 428/408 |
| 2014/0313636 | A1* | 10/2014 | Tour | H01G 11/72 361/502 |
| 2014/0335011 | A1* | 11/2014 | Dubois | C01B 32/184 423/448 |
| 2015/0023858 | A1* | 1/2015 | Tour | C01B 21/064 423/276 |
| 2015/0291431 | A1* | 10/2015 | Tang | B82Y 30/00 361/508 |
| 2015/0318120 | A1* | 11/2015 | He | B82Y 30/00 361/502 |
| 2017/0088944 | A1* | 3/2017 | Sultana | C23C 16/26 |
| 2017/0369320 | A1* | 12/2017 | Zhamu | C09D 7/61 |
| 2018/0170003 | A1* | 6/2018 | Livingston | B32B 27/28 |

OTHER PUBLICATIONS

Arul et al., "The mechanism of direct laser writing of graphene features into graphene oxide films involves photoreduction and thermally assisted structural rearrangement," Carbon, Dec. 2015, pp. 423-431, vol. 99.
Basu et al., "Scanning thermal lithography: Maskless, submicron thermochemical patterning of photoresist by utracompliant probes," J. Vac. Sci. Technol. B, 2004, pp. 3217-3220, vol. 22, Issue 6.
Chan et al., "Low-temperature synthesis of graphene on Cu using plasma-assisted thermal chemical vapor deposition," Nanoscale Research Letters, 2013, pp. 1-5, vol. 8.
Di Bartolomeo, "Graphene Schottky diodes: An experimental review of the rectifying graphene/semiconductor heterojunction," Physics Report, Oct. 2015, pp. 1-58, vol. 606.
Ding et al., "Selective Growth of Well-Aligned Semiconducting Single-Walled Carbon Nanotubes," Nano Lett., Jan. 2009, pp. 800-805, vol. 9, No. 2.
El-Kady et al., "Direct Laser Writing of Graphene Electronics," ACS Nano, 2014, pp. 8725-8729, vol. 8, Issue 9.
El-Kady et al., "Engineering three-dimensional hybrid supercapacitors and microsupercapacitors for high-performance integrated energy storage," PNAS, Apr. 2015, pp. 4233-4238, vol. 112, No. 14.
El-Kady et al., "Laser Scribing of High-Performance and Flexible Graphene-Based Electrochemical Capacitors," Science, Mar. 2012, pp. 1-25, vol. 335, Issue 6074.
Fan et al., "Manipulation of nanowires in suspension by ac electric fields," Applied Physics Letters, Nov. 2004, pp. 4175-4177, vol. 85, No. 18.
Fenwick et al., "Thermochemical nanopatterning of organic semiconductors," Nature Nanotechnology, Sep. 2009, pp. 664-668, vol. 4.
Gabriel, "Large Scale Production of Carbon Nanotube Transistors: A Generic Platform for Chemical Sensors," Mat. Res. Soc. Symp. Proc., 2003, pp. Q12.7.1-Q12.7.7, vol. 776.
Gaitas et al., "A device for rapid and quantitative measurement of cardiac myocyte contractility," Review of Scientific Instruments, 2015, pp. 1-6, vol. 86.
Gaitas et al., "A method to measure cellular adhesion utilizing a polymer micro-cantilever," Appl. Phys. Lett., Sep. 2013, pp. 1-7, vol. 103, Issue 12.
Gaitas et al., "An experimental study of the contact mode AFM scanning capability of polyimide cantilever probes," Ultramicroscopy, 2006, pp. 874-880, vol. 106.

Gaitas et al., "A piezo-thermal probe for thermomechanical analysis," Rev. Sci. Instrum., May 2011, pp. 1-4, vol. 82.
Gaitas, "A preliminary study of spatial resolution enhancement of confocal and triangulation displacement meters using contact mode scanning probes," Review of Scientific Instruments, Feb. 2008, pp. 1-5, vol. 79.
Gaitas et al., "A probe with ultrathin film deflection sensor for scanning prove microscopy and material characterization," Sensors and Actuators A: Physical, 2011, pp. 1-4, vol. 168, Issue 2.
Gaitas et al., "Characterization of room temperature metal micobolometers near the metal-insulator transition regime for scanning thermal microscopy," Applied Physics Letters, 2009, pp. 1-3, vol. 95.
Gaitas et al., "Hot-spot detection and calibration of a scanning thermal probe with a noise thermometry gold wire sample," Journal of Applied Physics, 2013, pp. 1-6, vol. 113.
Gaitas et al., "Nicekl foil microcantilevers for magnetic manipulation and localized heating," Sens Lett., Dec. 2013, pp. 2341-2344, vol. 11, No. 12.
Gaitas et al., "Piezo-thermal Probe Array for High Throughput Applications," Sens. Actuators A Phys., Oct. 2012, pp. 125-129, vol. 186.
Gaitas et al., "Piezoresistive Probe Array for High Throughput Applications," Procedia Engineering, 2011, pp. 1445-1448, vol. 25.
Gaitas et al., "SU-8 microcantilever with an aperture, fluidic channel, and sensing mechanisms for biological and other applications," J. Micro. Nanolithologr. MEMS MOEMS, Sep. 2014, pp. 1-8, vol. 13, No. 3.
Gaitas, "Tip-based chemical vapor deposition with a scanning nano-heater," Appl. Phys. Lett., 2013, pp. 1-2, vol. 102.
Hata et al., "Water-Assisted Highly Efficient Synthesis of Impurity-Free Single-Walled Carbon Nanotubes," Science, Nov. 2004, pp. 1362-1364, vol. 306.
Jamshidi et al., "Dynamic manipulation and separation of individual semiconducting and metallic nanowires," Nature Photonics, Feb. 2008, pp. 85-89, vol. 2.
Kalita et al., "Fundamentals of Chemical Vapor Deposited Graphene and Emerging Applications," Graphene Materials—Advanced Applications, 2017, pp. 41-66.
Kedzierski et al., "Epitaxial graphene transistors on SiC substrates," IEEE Transactions on Electron Devices, Sep. 2008, pp. 1-25.
Kim et al., "Large-scale pattern growth of graphene films for stretchable transparent electrodes," Nature, Feb. 2009, pp. 706-710, vol. 457.
Kim et al., "Low-temperature synthesis of large-area graphene-based transparent conductive films using surface wave plasma chemical vapor deposition," Applied Physics Letters, Mar. 2011, pp. 1-3, vol. 98.
Kwak et al., "Near room-temperature synthesis of transfer-free graphene films," Nature Communications, Jan. 2012, pp. 1-7, vol. 3.
Lai et al., "Development and Testing of Nano Robot End Effector for Cell Electrophysiology and Elastography Studies," Proceedings of the IEEE Nano 2011 Conference, 2011, pp. 1-4.
Lai et al., "Ultra-compliant Thermal AFM Probes for Studying of Cellular Properties," 10th IEEE International Conference on Nanotechnology, 2010, pp. 1-4.
Lee et al., "Synthesis of conducting transparent few-layer graphene directly on glass at 450° C." Nanotechnology, 2012, pp. 1-9, vol. 23.
Li et al., "Large-Area Synthesis of High-Quality and Uniform Graphene Films on Copper Foils," Science, 2009, pp. 1312-1314, vol. 324.
Liang et al., "Transparent, highly conductive graphene electrodes from acetylene-assisted thermolysis of graphite oxide sheets and nanographene molecules," Nanotechnology, 2009, pp. 1-6, vol. 20.
Malshe et al., "Tip-based nanomanufacturing by electrical, chemical, mechanical and thermal processes," CIRP Annals—Manufacturing Technology, 2010, pp. 628-651, vol. 59, Issue 2.
Mitra et al., "Thermally actuated tapping mode atomic force microscopy with polymer microcantilevers," Feb. 2009, Review of Scientific Instruments, pp. 1-4, vol. 80.

(56) References Cited

OTHER PUBLICATIONS

Mohamed et al., "Fabrication of spintronics device by direct synthesis of single-walled carbon nanotubes from ferromagnetic electrodes," Science and Technology of Advanced Materials, 2008, pp. 1-5, vol. 9.
Novoselov et al., "Electric Field Effect in Atomically Thin Carbon Films," Science, Oct. 2004, pp. 1-5.
Park et al., "Fast growth of graphene patterns by laser direct writing," Applied Physics Letters, 2011, pp. 1-3, vol. 98.
Qian et al., "Uniform InGaAs quantum dot arrays fabricated using nanosphere lithography," Applied Physics Letters, 2008, pp. 1-3, vol. 93.
Rafiee, "Graphene-based Composite Materials," A Thesis Submitted to the Graduate Faculty of Rensselaer Polytechnic Institute, Apr. 2011, pp. 1-75.
Randall et al., "Atomic precision patterning on Si: An opportunity for a digitized process," Microelectronic Engineering, 2010, pp. 955-958, vol. 87, Issues 5-8.
Rümmeli et al., "Direct Low-Temperature Nanographene CVD Synthesis over a Dielectric Insulator," ACS Nano, Jun. 2010, pp. 4206-4210, vol. 4, No. 7.
Somani et al., "Planer nano-graphenes from camphor by CVD," Chemical Physics Letters, 2006, pp. 56-59, vol. 430.
Su et al., "Direct writing of graphene patterns and devices on graphene oxide films by inkjet reduction," Nano Research, Sep. 2015, pp. 1-17.
Sutter et al., "Epitaxial graphene on ruthenium," Nature Publishing Group, Apr. 2008, pp. 406-411, vol. 7.
Vishwakarma et al., "Transfer free graphene growth on SiO2 substrate at 250° C." Scientific Reports, Mar. 2017, pp. 1-8, vol. 7.
Vollebregt et al., "A Transfer-Free Wafer-Scale CVD Graphene Fabrication Process for MEMS/NEMS Sensors," IEEE 29th International Conference on Micro Electro Mechanical Systems (MEMS), 2016, pp. 1-4.
Weatherup et al., "In Situ Characterization of Alloy Catalysts for Low-Temperature Graphene Growth," Nano Letters, 2011, pp. 4154-4160, vol. 11.
Wei et al., "Nanoscale tunable reduction of graphene oxide for graphene electronics," Science, 2010, pp. 1-19, vol. 328.
Wong et al., "Flexible Electronics: Materials and Applications," Springer, 2009, pp. 1-473, ISBN: 978-0-387-74362-2.
Yu et al., "Graphene segregated on Ni surfaces and transferred to insulators," Applied Physics Letters, 2008, pp. 1-3, vol. 93.
Zhang et al., "Advanced review of graphene-based nanomaterials in drug delivery systems: Synthesis, modification, toxicity and application," Mater. Sci. Eng. C. Mater. Biol. Appl., Aug. 2017, pp. 1363-1375, vol. 77.
Zhang et al., "Direct writing of electronic devices on graphene oxide by catalytic scanning probe lithography," Nature Communications, Nov. 2012, pp. 1-6, vol. 3.
Zheng et al., "Metal-catalyzed crystallization of amorphous carbon to graphene," Applied Physics Letters, 2010, pp. 1-3, vol. 96.
Zhu et al., "A colorimetric receptor combined with a microcantilever sensor for explosive vapor detection," Applied Physics Letters, 2011, pp. 1-4, vol. 98.

* cited by examiner

DIRECT AND SELECTIVE AREA SYNTHESIS OF GRAPHENE USING MICROHEATER ELEMENTS

BACKGROUND

Since 2004, graphene has been hailed as one of the most promising materials with the potential to revolutionize applications in electronic devices, such as transistors (suggesting much higher clock speed, e.g., 10-100 GHz) and interconnects, radiofrequency-electronics, energy storage, drug delivery, solar cells, and photonics.

Graphene can be prepared in several ways. Initially, graphene was prepared by exfoliating it from graphite using a scotch tape. This technique has several drawbacks, and it is extremely time consuming. A second method is thermally decomposing graphene directly on a high cost SiC substrates, which requires a very high temperature (>1300° C.) annealing step and high vacuum. The resulting graphene exhibits a small domain structure and oftentimes is non-uniform. Another method entails reducing graphene oxide (GO). GO can be produced from graphitic materials in large quantities at near room temperature. Reduced GO derived graphene has substantial structural defects that affect its mechanical and electrical properties.

Chemical vapor deposition (CVD) has been used to produce high quality graphene by decomposing hydrocarbons, most commonly on catalyst substrates such as metals and metal alloys. The quality and properties of CVD produced graphene depend on the type of the metal catalyst, precursors, hydrocarbon used, reaction temperature and pressure. This method usually requires transferring graphene to an insulating substrate, which is challenging and can compromise graphene properties. Therefore, directly synthesizing graphene on an insulating surface is a topic of interest.

Initially, CVD methods required high deposition temperatures >1000° C. However, in order to achieve mass production of graphene and IC compatible processes, lower temperatures and simpler approaches had to be developed utilizing metal and alloy catalysis and/or alternative carbon sources. Some of these methods still require a high temperature step (~1000° C.) while others require transferring graphene to an insulating substrate after growth. Tackling both the temperature and transferring issues, low temperature processes that can grow graphene directly on a dielectric layer have been developed. For example, graphene growth at 325° C. using acetylene directly on an insulating substrate and synthesis at 450° C. using a plasma-enhanced chemical vapor deposition process on glass with a Ni catalytic film have been used.

BRIEF SUMMARY

Embodiments of the subject invention provide novel and advantageous apparatuses and methods for direct and selective-area synthesis of graphene. A microheater element can be heated and can be in contact with a catalyst metal layer, such as a tin (Sn) layer. In order to meet the needs of the industry, a fabrication process should have the following properties: (1) high quality graphene (2) fabricated directly on (3) an insulating substrate (e.g., glass, $SiO_2$, polymer), (4) with submicron resolution, employing a process that (5) minimizes the fabrication steps, (6) is compatible with existing fabrication processes, and (7) is inexpensive at (8) a relatively lower temperature (preferably <300° C.) and (9) at pressures close to (or equal to) atmospheric pressure. Embodiments of the subject invention can address all of these required properties.

In an embodiment, a method of synthesis of graphene can comprise: preparing a substrate comprising a carbon (C) layer and a metal layer (e.g., an Sn layer) in a chamber; disposing a thermal probe tip on the metal layer; heating the thermal probe tip such that a graphene is for tried on the substrate; and removing the metal layer from the substrate.

In another embodiment, an apparatus for synthesis of graphene can comprise: a chamber; a thermal probe disposed in the chamber; a thermal interface circuit heating the thermal probe; and a scan controller controlling a movement of the thermal probe.

In yet another embodiment, a method of synthesis of graphene can comprise: depositing a C layer on a substrate (e.g., a substrate comprising a silicon (Si) layer and an oxide (e.g., $SiO_2$) layer on the Si layer); depositing a metal layer on the C layer; preparing the substrate including any layers of the substrate itself (e.g., Si layer and oxide layer), the C layer, and the metal layer in a chamber; maintaining a pressure of the chamber under 1 atm (e.g., under 1 Torr in some embodiments and under $5 \times 10^{-5}$ Pa in some further embodiments); flowing an inert gas (e.g., argon gas) in the chamber; contacting a thermal probe tip to the metal layer; heating the thermal probe tip to a temperature of at least 250° C. such that graphene is formed on the substrate; and etching the substrate (e.g., with $HNO_3$ solution). The metal layer can be an Sn layer, though embodiments are not limited thereto.

DETAILED DESCRIPTION

Embodiments of the subject invention provide novel and advantageous apparatuses and methods for direct and selective-area synthesis of graphene. A microheater element can be heated and can be in contact with a metal layer, such as a tin (Sn) layer. In embodiments of the subject invention, making use of a tip-based micro-reactor to directly pattern graphene structures on insulating substrates provides exact control over the position, orientation, and size of the resulting graphene. This is achieved by creating a controllable manufacturing environment using a locally heated scanning probe or one- and two-dimensional probe arrays (for high throughput). The methods and apparatuses of embodiments of the subject invention allow for the use of commonly available substrates such as glass and polymers for flexible electronics, and requires minimal substrate preparation, low temperature (250° C.) processes, and complementary metal-oxide-semiconductor (CMOS) compatibility. By confining the manufacturing environment to a sub-micron region through nano- and micro-reactions generated by localized heating of the tip, device characteristics can be controlled at a nanoscale level allowing for maskless graphene nano-synthesis. The fabrication tools and methods address the needs in several industries that rely on nano-manufacturing, such as semiconductors, defense, wireless communications, and solar energy harvesting.

Direct writing of graphene on insulating substrates can enable graphene-based electronics especially in flexible electronics applications. In the related art, direct writing has been mainly focused on reducing insulating graphene oxide films (GO) to locally create graphene by direct patterning. Direct patterning to reduce GO has been accomplished using high resolution scanning thermal or conductive AFM probes and with a much faster, but lower resolution, laser writing technique. Such approaches offer a much simpler graphene fabrication solution by eliminating photolithography and, in one step, achieving reduction and patterning. However, GO has to be produced and cover the entire substrate and, after reduction, the substrate is still covered with GO with the exception of the patterned areas. More importantly, reduced GO suffers from the limitations discussed previously because it does not have the same properties as pure graphene. Laser-induced chemical vapor deposition (LCVD) has been used to directly grow graphene on a Ni foil in a $CH_4/H_2$ environment. However, this technique requires transferring the graphene to an insulating substrate and the produced graphene has the minimum features greater than a few microns. Further, the laser beam can increase the Ni temperature locally to 1000° C. Embodiments of the subject invention can solve many of these issues.

In many embodiments, one step and one tool are required to complete the graphene fabrication and patterning process compared to electron beam lithography, conventional photolithography, and other scanning probe based techniques that require several steps and tools. This reduces the cost, time, and manpower for nano-fabrication while meeting future performance requirements.

In an embodiment, an apparatus or system includes a scanning probe and array with embedded heaters and deflection sensing elements for detection of contact and movement. The heaters generate localized micro-reaction environments to induce growth, decomposition/deposition. The entire system resides inside a chamber with optical control. The system controls graphene synthesis by a single probe, then shows high throughput fabrication using probe arrays and finally demonstrates the effectiveness of the approach by fabricating a simple graphene field effect transistor (G-FET) device. The heating element has any shape. In a further embodiment, the heating element is a sharp tip. In another embodiment, the heating element has a flat surface of any shape such as rectangular, round, and other shape.

In many embodiments, an apparatus can be used to direct-grow graphene using cutting-edge scanning nano-heater probes to achieve the controlled manufacturing of nanostructures, nano-devices, and nano-scale building blocks. In any non-spontaneous chemical reaction where reactants are transformed to end products, input energy such as heat is required. A moving nano-heater (also referred as heating element) controls reactions at nano- or micro-scale so that the size, position, and orientation of a nanostructure can be controlled. By controlling the size, position, and orientation of each nanostructure, advanced nano-scale components will be attainable. With their proven capability to generate highly-localized temperature gradients, thermal probes are used to create a highly-localized manufacturing environment for the controlled fabrication of specific nanostructures.

In a number of industries that require nano-manufacturing, current fabrication technologies are slow or inadequate to meet the demands for smaller features with high throughput for mass production. Methods of embodiments of the subject invention have the potential for high throughput fabrication.

Leading semiconductor manufacturers and chip foundries regularly bring new technologies into production that exhibit ever decreasing dimensions. The tools and methods of embodiments of the subject invention find an immediate application in the semiconductor industry for fabricating high performance devices such as G-FETs, sensors, and detectors.

Currently, the related art includes no localized graphene fabrication tools with ability to control size/growth. In the past few years, various researchers have documented the ability to grow, deposit, and even manipulate nanostructures but none have been able to control the manufacturing process as defined in embodiments of the subject invention. Researchers have been able to grow thickly aligned patches of carbon nanotubes with low degree of regional predictability. However, neither growth of individual metal lines nor control of their dimensions and orientation has been demonstrated in the related art. Similarly, researchers have had some success with the uniform growth of quantum dot arrays from catalyst seeds. In addition, these experiments have been plagued with non-uniform growth problems that cannot be remedied at this point in time. Recently, there has been some progress in the successful manipulation of individual nanowires. However, the methods used are highly complex, exceptionally slow, and depend on extremely difficult protocols for follow-up manipulation, measurement, and modification. In summary, there have been very few promising developments in the quest for controlled nano-manufacturing. Approaches like electron beam lithography (EBL) are sequential, slow, and require several steps. In contrast, the tools and method of embodiments of the subject invention offer a one-step solution and high throughput fabrication.

Atomic force microscopy (AFM) probe tips have considerable potential as part of a nanomanufacturing solution. AFM (or scanning probe microscopy (SPM)) currently represents one of the most popular tools for bridging the gap between macro and micro/nano. In addition, the scientific community has been successfully developing cutting-edge macroscopic technology for the manipulation, enhancement, and optimization of AFM tips for decades. There has been some notable progress in the search for a controlled nano-manufacturing environment with IBM's Millipede program. The Millipede project involves the use of a proprietary topographic data storage technology that utilizes heated AFM cantilever arrays to create indentations in polymers. This work is not focused on the development of a viable nanomanufacturing solution. Likewise, there have been efforts for nano-patterning using thermal probes. These efforts have concentrated on 2-dimensional thermo-chemical patterning of organic materials. Other recent efforts have concentrated 2-dimensional precision patterning on Si. In summary, tip-based nanomanufacturing employing chemical, electrical, thermal, and mechanical means have been used to alter a substrate in two dimensions or in depositing liquid chemical reagents.

Below, Table 1 outlines the benefits of embodiments of the subject invention compared to the existing manufacturing technologies.

TABLE 1

Comparison of the embodiment and the competing technologies.

| Technology | Through-put** | Small size/ feature | Steps to complete graphene device* | Direct graphene fabrication | Graphene quality |
|---|---|---|---|---|---|
| Thermal probe approach - disclosed | ✓ | ✓ | 1 | Yes | High |
| Laser GO reduction | ✓ | x | ≥2 | No | Low |
| AFM GO reduction | ✓ | ✓ | ≥2 | No | Low |
| Conventional patterning/ fabrication | ✓ | x | ≥5 | No | High |

*Steps: AFM, Laser at least two (GO layer and reduction). Conventional patterning: photo-resist, pattern, develop/washing, deposition, lift off-also expensive mask making.
**For probe based techniques arrays enable high throughput.

Embodiments of the subject invention include a tip-based nanofabrication method for localized chemical synthesis of graphene. A heated probe tip can be easily arrayed for multi-probe operation and can be used to locally heat the area(s) of interest.

Figure 1:
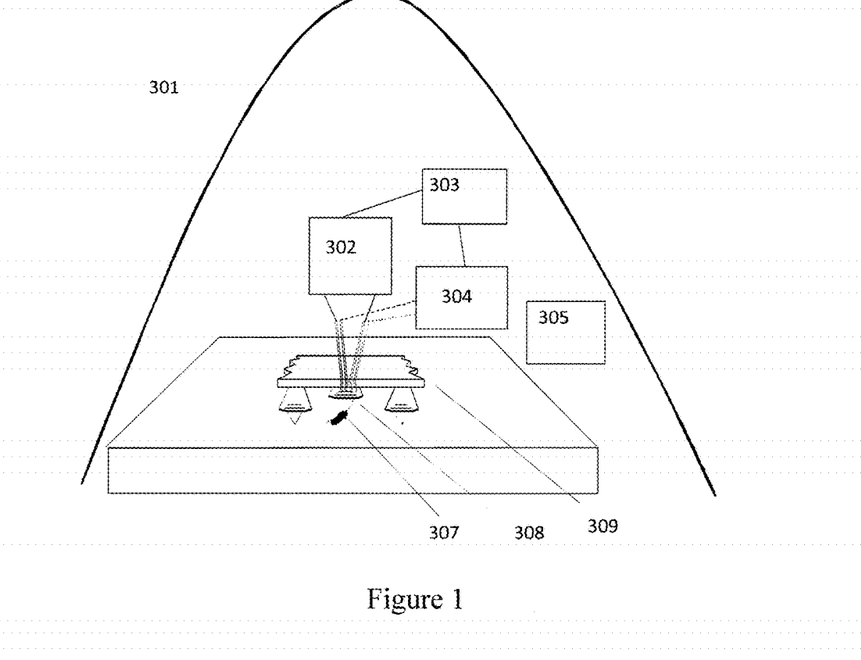
FIG. 1 shows an apparatus for synthesis of graphene according to an embodiment of the subject invention.

FIG. 1 shows an apparatus for synthesis of graphene according to an embodiment of the subject invention. In particular, FIG. 1 shows a probe array arrangement. This arrangement comprises an environmental chamber 301, a thermal interface circuit 302 for heating the probe, a computer interface 303 for controlling the probe position, for viewing topographical images, and for controlling the growth, a topographical sensor interface circuit 304 to control the topographical sensor, and an XY scan controller and stage 305 in order to control the movement of the probe(s) and sample relative to each other. The grown graphene 307 is shown, and the heated cantilever probe(s) 308 is attached along with the arrayed structure 309. The chamber 301 may allow for controlled pressure and for increasing pressure to desired levels. The chamber 301 may include a hot plate under the sample. In the graphene synthesis process, the substrate is exposed an inert gas such as Argon. The substrate contains a metal catalyst thin film and amorphous carbon thin film. The reaction is directed by the localized heating provided by the heated tips. Eventually the desired shape of graphene is created on the substrate directly without the need of a masking process.

Each probe has a cantilever 308 with a sharp tip, a thermal element (which comprises of a pair of conductors extending to a junction at the distal end of the cantilever beam to allow passage of current; the probe tip is thermally connected to the conductors at the junction) and a topographical sensing element (such as a piezoresistor). The probes are placed in the environmental chamber 301. As the thermal element 308 heats up locally and is moved, graphene is grown in the area of probe movement.

The tip can have a diameter with a submicron length, which can be, for example, in a range of from 1 nm to 100 nm. Moreover, the tip can be tailored to the desired fabricated device dimensions. The probe tip is heated resistively. The resistive heaters are designed so that most of the heating occurs at the end part of the cantilever. The substrate is heated over a diameter that is similar to the tip diameter. This technique allows for controlled synthesis and controlled direction at the nanoscale. Embodiments of the subject invention can utilize SPM nano-heater cantilever probes to controllably manufacture nanostructures. With their proven capacity to generate highly-localized temperature gradients, these probes can be used to create a highly-localized manufacturing environment for the controlled fabrication of specific nanostructures. In another embodiment, the tip is a flat surface of round shape or rectangular shape or any other desired shape. In one embodiment, resistive heating is used. In another embodiment, electromagnetic radiation is used to heat the tip by induction. In yet another embodiment, light is used to heat the tip.

Figure 2:
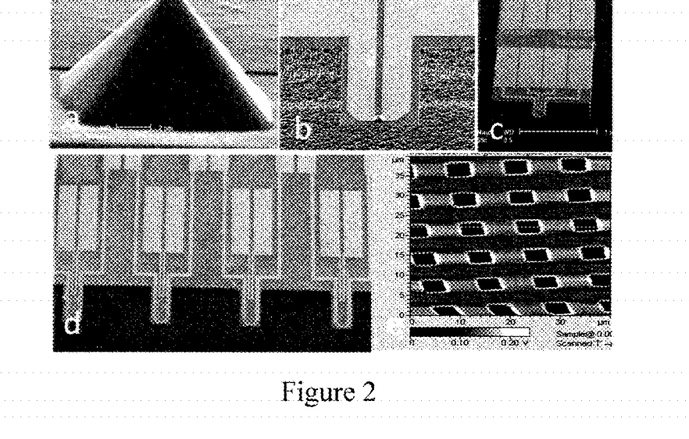
FIG. 2 shows scanning electron microscope (SEM) images of a thermal probe.
Figure 3:
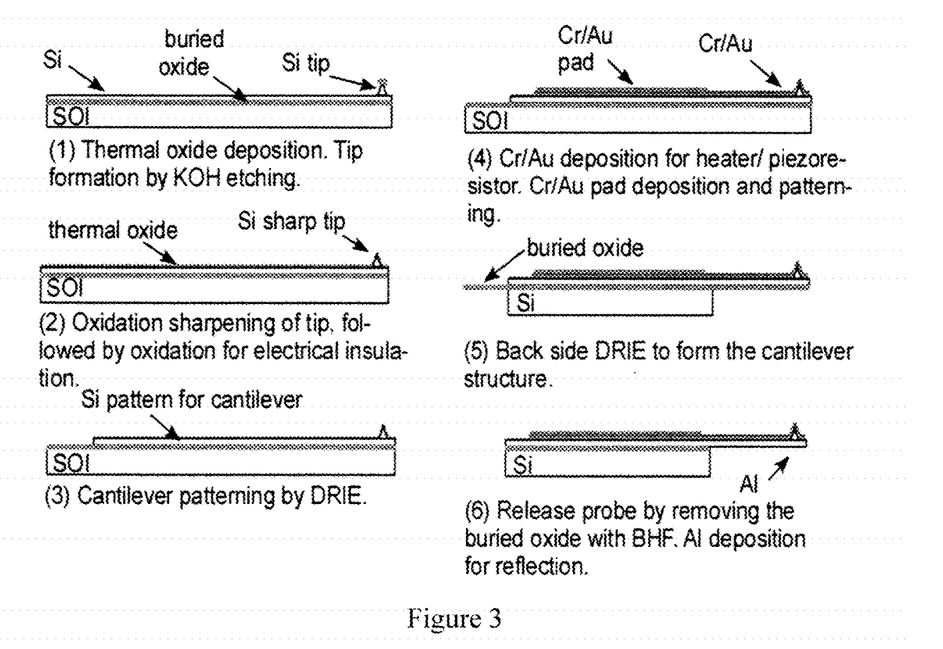
FIG. 3 shows a process flow for fabricating a thermal probe.

FIG. 2 shows scanning electron microscope (SEM) images of a thermal probe, and FIG. 3 shows a process flow for fabricating a thermal probe. To fabricate the heaters in one embodiment, a silicon-on-oxide (SOI) process is used as shown FIG. 3, and FIG. 2 shows the high temperature probes. In one embodiment, the probe fabrication process has eight major process steps and requires four masks. Referring to FIG. 3, the process starts with a SOI wafer with 10 μm Si layer thickness and 1 μm buried oxide. A thermal oxide mask is deposited and patterned for the probe tip. The tip is then formed using KOH anisotropic wet etching. The oxide mask is then removed and the tip is sharpened with several oxide sharpening steps. A 100-nm thick thermal oxide is grown on the wafer in order for electrical insulation. The Si cantilever is then patterned with deep reactive ion etching (DRIE). Metal lines are deposited on the top of the cantilever structure to form heaters. The metal lines can be, for example, any combination of Cr/Au, Ti/Ir, or Ti/W (typical thickness 10 nm/100 nm) depending on the application and temperature requirement for the thermal probe. A passivation layer may be included such as a (100 nm) $Si_3N_4$ passivation layer. The device may also be annealed at 900° C. for two hours. The thermal probe structure is formed by a back side DRIE process. The probes can be released by removing the buried oxide layer using BHF. FIG. 2 shows SEM images of cantilevers manufactured by the process of FIG. 3. FIG. 2(a) shows a probe tip smaller than 1 μm, and FIG. 2(b) shows a thermal probe. In addition, FIG. 2(c) shows a chip with two designs, each cantilever including a deflection sensing element and a heating element. FIG. 2(d) shows an array of therntal/piezo probes, and FIG. 2(e) shows scans using the thermal probes on a silicon grating. In particular, sensing elements are embedded on the cantilever to circumvent the use of conventional AFMs in order to detect contact and perform topographical imaging (see, e.g., FIGS. 2(c) and 2(d)). Moreover, approach and contact can also be controlled to within 0.5 microns optically with an optical microscope without damage to the tip and without affecting fabrication.

Figure 4A:
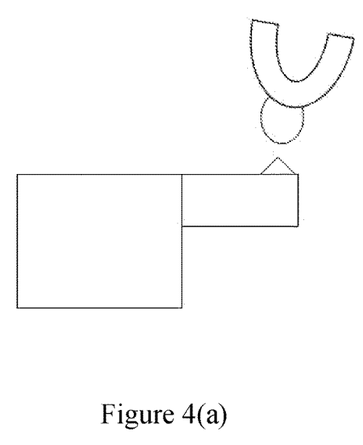
FIG. 4(a) shows thermocouple approaching a thermal probe for calibration.

A 20 μm thermocouple to measure the tip temperature of the thermal probe may be used. FIG. 4(a) shows the thermocouple in contact to a thermal probe during the temperature measurement, wherein a Keithley 2400 source meter is used to increase and monitor the power through the probe.

Figure 4B:
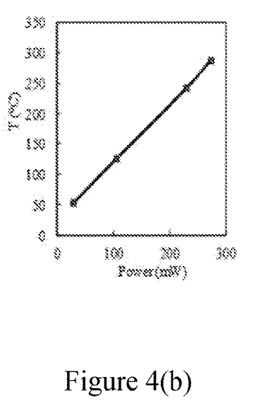
FIG. 4(b) shows a calibration curve of a thermal probe.

FIG. 4(b) shows the temperature achieved as a function of input power of a thermal probe acting as a heating element. The thermal probe can reach 550° C., even with the substantial thermal load represented by the comparatively large thermocouple.

Figure 5:
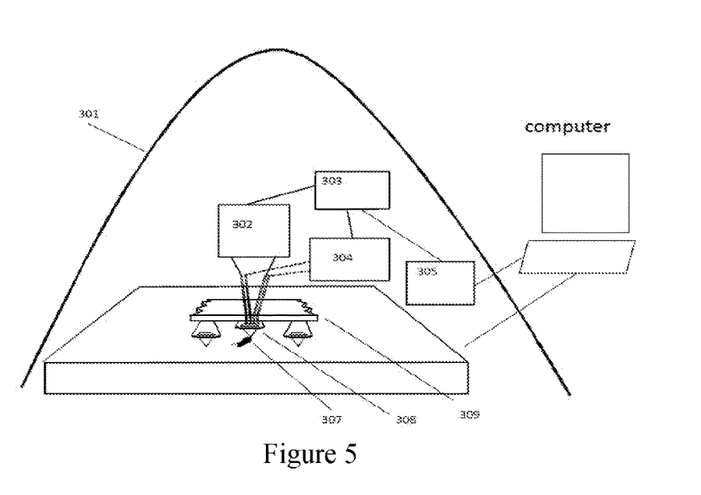
FIG. 5 shows a scanning probe system with a vacuum chamber for nanodevice growth according to an embodiment of the subject invention.

FIG. 5 shows a scanning probe system with a vacuum chamber for nanodevice growth according to an embodiment of the subject invention. The system has a vacuum chamber that allows various scanning conditions. The scanning motion of the probe with nanometer resolution can be achieved using an XYZ stage driven by piezoelectric actuators (0.2 nm resolution). This stage moves the sample relative to the probe tip which is fixed on a post during scanning. A customized piezo positioner and a motorized stage are used to align the probe tip to the desirable scanning region on the sample. The customized motorized linear stage is used. An optical microscope is used to monitor the probe tip and the sample movement from the top of the jar. Four connectors are fitted on the sidewall of the bell jar chamber, one for gas inlet, one for gas outlet, one for electrical connection feed-through, and one for pressure monitoring. The inlet is connected to tubes that are connected to 3 flow-meters that in turn connect to gas cylinders. The outlet is connected to a pump and the gases are vented out of the lab. The thermal probes are heated with a source meter. An alternative set-up includes integrating a dual beam environmental SEM with gas injection capability.

Figure 6A:
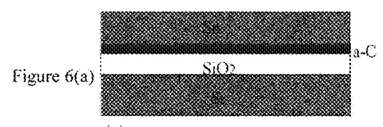
FIGS. 6(a)-6(e) show a diagram of a tip-based graphene process according to an embodiment of the subject invention.
Figure 6B:
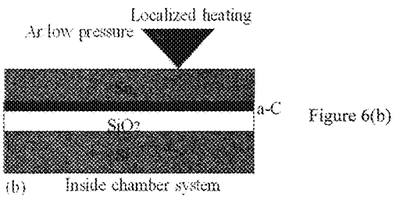
Figure 6C:
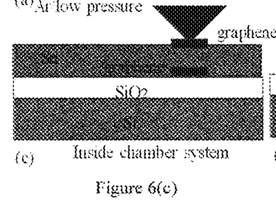
Figure 6D:
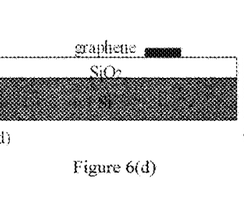
Figure 6E:
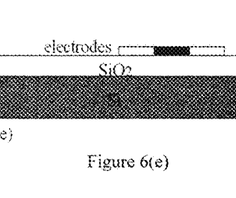

FIGS. 6(a)-6(e) show a diagram of a tip-based graphene process according to an embodiment of the subject invention. Referring to FIG. 6(a), 50-nm C and 500-nm Sn layers will be deposited by electron beam evaporation on $SiO_2$/Si (100 nm oxide) or other method and glass substrates under Ar gas and low pressure. Referring to FIG. 6(b), instead of annealing the entire sample, thermal probes can be used for localized annealing, while maintaining the chamber's pressure at 1 Torr or less (e.g., $5 \times 10^{-5}$ Pa) and the probe tip temperature at 250° C. (or at least 250° C.). An inert gas, such as Ar, may be introduced under constant flow rate. The reaction will be directed by localized heating provided by the heated tips. Heating will produce two layers of graphene, one near the top and one near the bottom of Sn as shown FIG. 6(c). After heating, the embodiment chemically etches the substrate with 10% $HNO_3$ solution to remove the Sn layer as shown FIG. 6(d).

FIGS. 12(a)-12(d) show a diagram of a graphene synthesis process according to an embodiment of the subject invention. Referring to FIGS. 12(a)-12(e), in an embodiment, a method can include directly growing graphene by flowing precursor gases on a substrate (e.g., Si/$SiO_2$) with a catalyst layer with modifications in order to adapt this to the new tip-based process. The precursor gases can include one or more hydrocarbons, such as methane. First, a metal layer is deposited on a substrate (e.g., $SiO_2$/Si) to be the catalyst layer. Candidate catalyst metal and alloys as catalyst (examples include Sn, Cu, Al, Ni, Al/Ni) suitable for a low temperature process are used. The chamber's pressure is lowered (for example, to less than 1 atm or less than 1 Torr) while the gasses are introduced (e.g., Ar/$H_2$/$CH_4$ or $C_2H_2$) under constant flow rates. The probe tip is heated at a constant temperature. Following graphene growth, the catalyst can be etched and then the sample can be rinsed and dried. Because the metal layer is relatively thin, after etching it, the graphene attaches to the substrate and does not drift away. The final step entails depositing Cr/Au (e.g., 10 nm/50 nm) contacts using lift-off (see, e.g., FIG. 12(d)).

In the process shown in FIGS. 12(a)-12(d), the metal layer can be deposited directly on the substrate, followed by deposition of a layer of amorphous carbon (α-C). Alternatively, the α-C can be deposited on the substrate first followed by deposition of the metal layer on the α-C layer. The metal layer can be, for example, Sn, though embodiments are not limited thereto and other metals can be used (e.g., Cu, Al, Ni, Al/Ni). The thickness of the metal layer can be, for example, less than 100 nm thick. In particular embodiments, the thickness of the metal layer can be 25 nm, 10 nm, 5 nm, about 25 nm, about 10 nm, about 5 nm, less than 50 nm, less than 40 nm, less than 30 nm, less than 25 nm, less than 20 nm, or less than 10 nm. The substrate can be, for example, Si, $SiO_2$, $SiO_2$/Si, glass, an insulator, a polymer, a plastic, a flexible polymer film, a polyimide, or a combination thereof.

The substrates including the Sn layer as described herein can be inserted in a custom scanning probe system. The thermal probes act as microheaters. The probes are mounted and set-up in the scanning system. The substrates are brought in contact with the micro-reactor probes, and the micro-reactors are heated in static mode (e.g., starting with a 1-hour reaction time of continuous heating) and can also be moved in a number of speeds and directions. The temperature of the probes may be varied, for example, starting with 250° C., to locally anneal the Sn/C layer following the recipe described above. The reaction can be directed by the localized heating provided by the heated tips. After, heating, the substrate can be chemically etched (e.g., with $HNO_3$ solution such as 10% $HNO_3$ solution) to remove the Sn layer (see, e.g., FIG. 6(d)). The resulting graphene can be characterized by using SEM, TEM, Raman Spectroscopy, EDS-SEM, XRD, UViS, ellipsometry, AFM for surface roughness, and/or Hall effect measurements. The final outcome may be part of a device, such as a graphene based field effect transistor (G-FET).

Specifically, a method for graphene manufacturing can comprise depositing at least one metal catalyst and amorphous carbon on a substrate; immersing the prepared substrate in a chamber; bringing (a) heated element(s) in contact with or at a constant distance from the substrate; and heating the element(s) to provide localized the heat necessary for a chemical reaction using at least one of a laser, microwave radiation, inductive heating, and/or resistive heating.

In a specific embodiment, the method further comprises at least one member selected from the group consisting of: raising and lowering the temperature of the element in a programmed manner; lowering the temperature gradually to anneal the nanostructure; and alternately heating and cooling to alternate growth and annealing steps.

In an embodiment, an apparatus to grow graphene can comprise: a heated element having at least one characteristic selected from the group consisting of: a) tip or tip array being a micromachined cantilever beam(s) with a resistive tip(s) at the distal end of the cantilever beam; b) tip or tip array being a micromachined cantilever beam(s) with a metallic tip at the distal end of the cantilever beam(s) to heat the tip by inductive heating; and c) tip or tip array being a micromachined cantilever beam(s) with an electrode extending to the tip(s) at the distal end of the cantilever beam, an element of any shape (for example of round or rectangular shape) or a frame containing a two dimensional array of tips; and means to monitor the movement and contact of the element to the substrate. The means to monitor movement can be at least one of the following: a photodetector and a laser to monitor the movement of the tip or tip array; a piezo-resistive element on the cantilever beam(s) to monitor the tip or tip array movement in relation to the substrate; a position controller and stage to control the movement of the tip or tip array relative and the substrate relative to each other; a piezo-electric element on the cantilever beam(s) to monitor the tip or tip array movement in relation to the substrate; a scanning probe microscope; an atomic force microscope; a triangulation meter; a confocal meter; a scanning tunneling microscope; a scanning electron microscope; an optical microscope; and an interferometer. In one embodiment, the chamber comprises: a plate to position the substrate; a plate with an electrode to place the substrate and apply an electric field between the tip or tip array and the plate; a plate with two or more electrodes on the sides to apply an electric field in the direction of the plate; gas pumps for controlling the pressure inside the chamber; a heated plate to place the substrate on and apply specific temperature to the substrate; coils for applying an AC magnetic field to inductively heat the tip or tip arrays, an inlet and an outlet; a controller for temperature control of the heated element; and one or more inert gasses.

Referring to FIGS. 1 and 5, an atomic force microscope (AFM) or scanning probe microscope (SPM) (both terms used interchangeably from hereon after as microscope) can also be included. For instance, a microscope with a chamber can be used. The probe tip or tip array can be mounted on the microscope holder. If resistive heating is used, then electrical connections, much like in scanning thermal microscopy, can be used connecting the tip or tip array to interface electronics residing outside of the chamber. Then, the microscope laser can be focused on the tip and reflected onto a photo-detector, much like a typical microscope. Inert gas can be pumped through the inlets of the chamber. The tip or tip arrays can be brought in contact with the sample substrate, and the tip or tip arrays can either be used for scanning the substrate for topographical mapping or for graphene growth. Scanning thermal microscopy is also possible with this setup.

Figure 7:
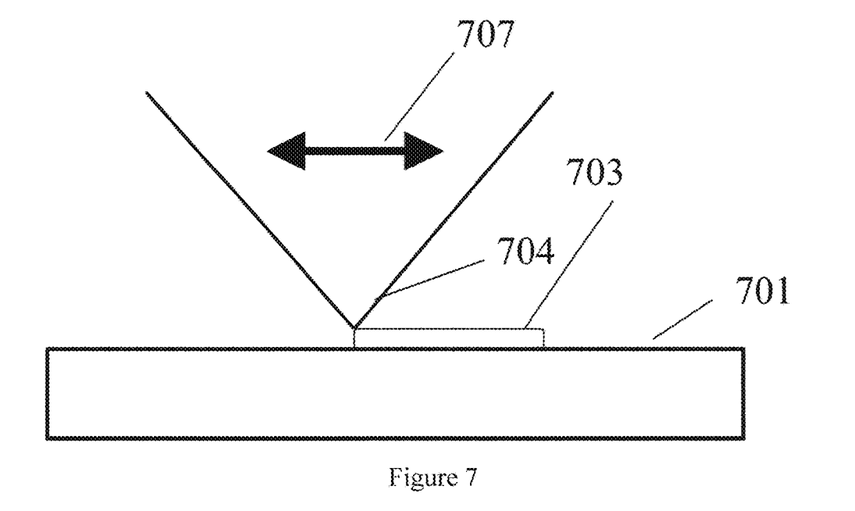
FIG. 7 shows growth of graphene according to an embodiment of the subject invention.

FIG. 7 shows growth of graphene according to an embodiment of the subject invention. Referring to FIG. 7, a substrate 701 contains a metal catalyst thin film and an amorphous carbon thin film. The probe 704 is moved as shown by arrow 707 causing graphene 703 to grow in the direction of the heater's movement on the substrate.

Figure 8:
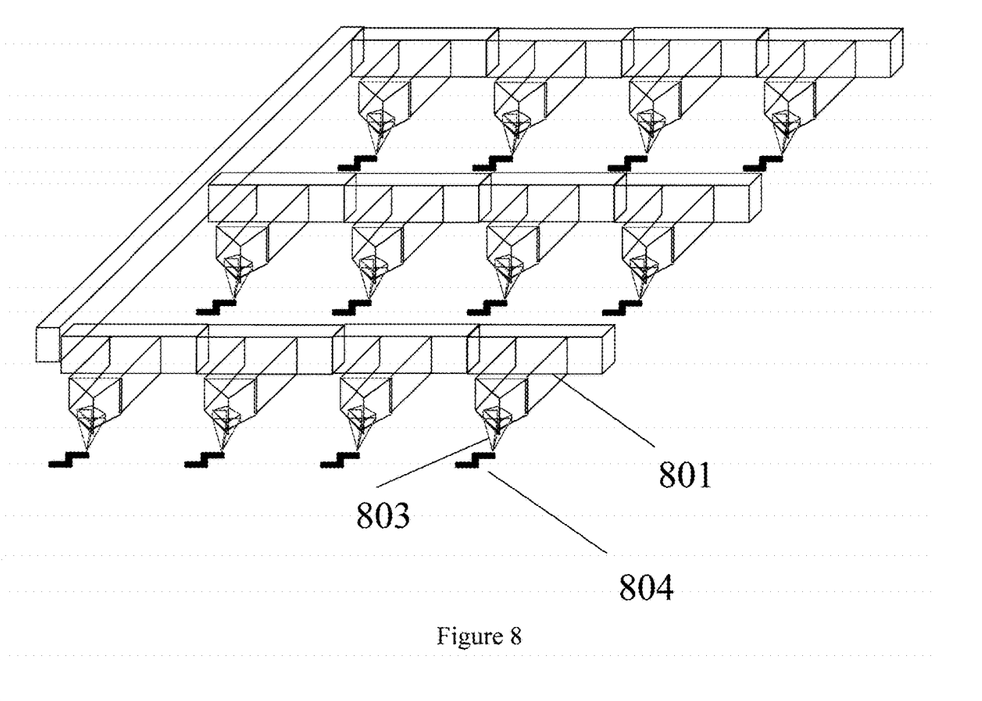
FIG. 8 shows a two dimensional probe array according to an embodiment of the subject invention.

FIG. 8 illustrates a two (2) dimensional probe array for highly parallel mass growth, where a cantilever 801 and a nanoscale tip 803 are shown. A graphene 804 has been grown with this method. This array can be extended to any number of probes and cantilevers. Several methods can be used to heat the tip including lasers, resistive, inductive heating etc. An embedded electrical lead may also be included so that an electric field may be formed between each tip and the sample for controlled growth. These types of arrays allow for massively parallel growth and therefore are particularly appealing, for instance, in manufacturing settings for semiconductor applications where entire wafers can be used simultaneously.

Figure 9:
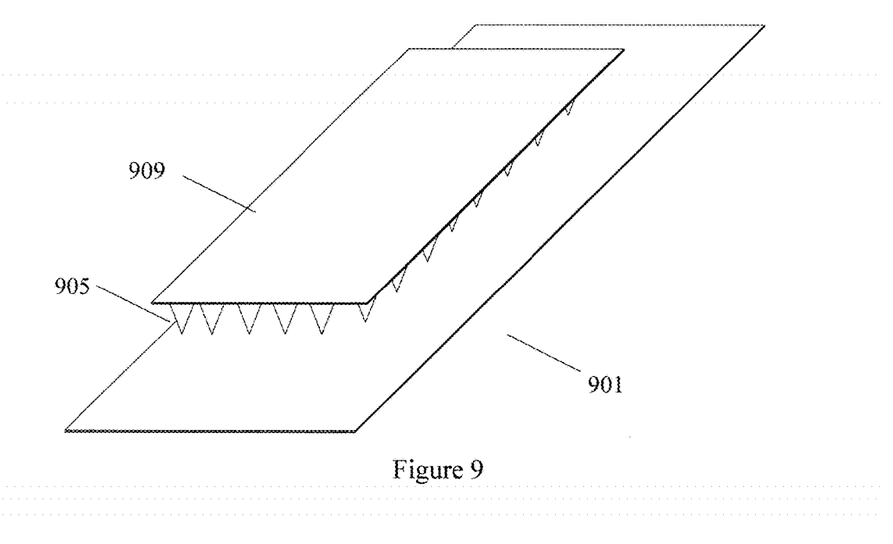
FIG. 9 shows a two dimensional probe array according to an embodiment of the subject invention.
Figure 10:
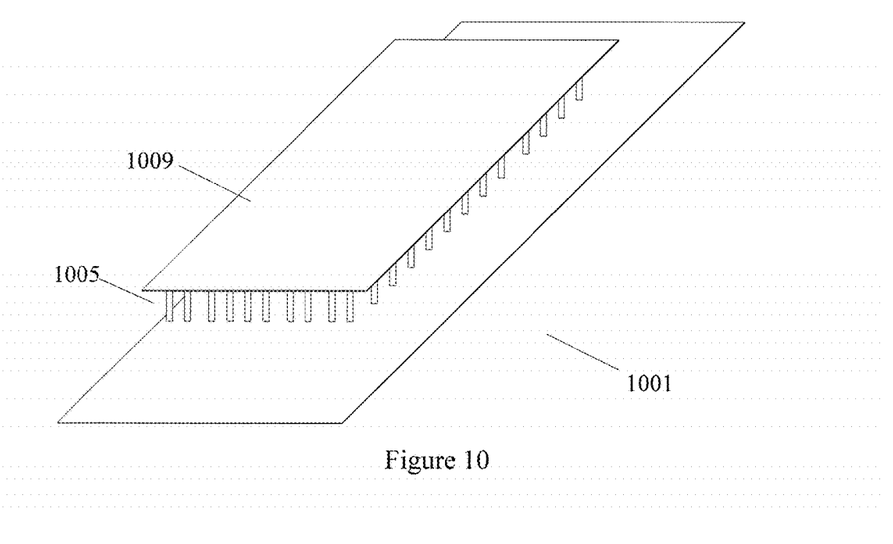
FIG. 10 shows a two dimensional probe array according to an embodiment of the subject invention.

FIGS. 9 and 10 illustrate alternative designs of two dimensional probes arrays in which the heated tips 905 or 1005 are not connected to cantilevers but to a solid frame 909 or 1009. The heated tips 905 or 1005) can be either triangular/pyramid shaped or tube-like or square-like. The heated tips could be needle shaped. The tips are held together by a frame 909 or 1009 which permits heating individual heaters either resistively or through other mechanisms described in the document via embedded circuitry or other means. As previously discussed, the heaters are either in contact or suspended over the substrate 901 or 1001 at a small distance from the substrate heating locally only the area of interest. The locally heated area could have a width of for example between 1 nm and 200 nm and it can be controlled by the tip's diameter. The heaters are then heated and optionally moved in the XYZ direction to direct growth. A mechanism can be used to control the contact force and/or distance from the substrate. In FIGS. 9 and 10, the entire frame 909 or 1009 may also be heated. In this case, the heat transfers to individual tips 905 or 1005 and locally heats the substrate 901 or 1001. This further simplifies the process since individual heating is not required for each tip.

Figure 11:
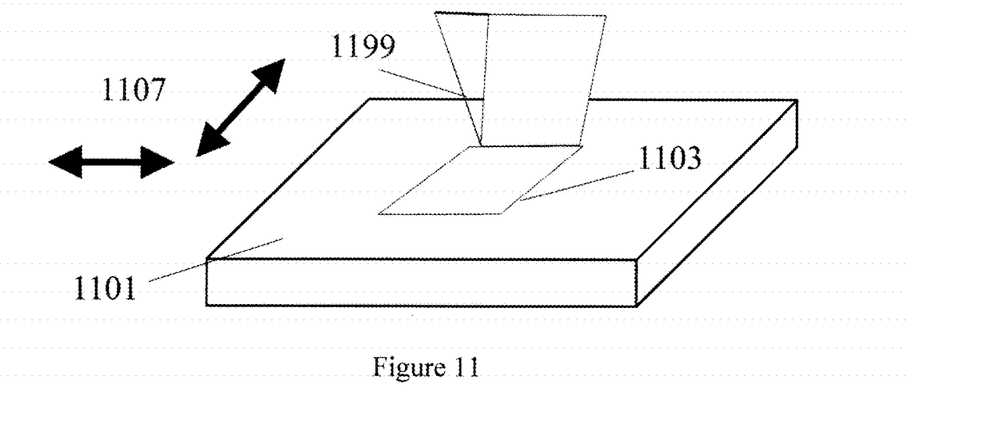
FIG. 11 shows a line-rectangle heater according to an embodiment of the subject invention.
Figure 12A:
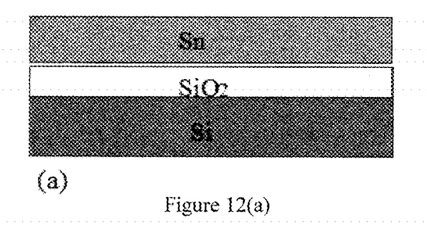
FIG. 12(a)-12(d) show a diagram of a graphene synthesis process according to an embodiment of the subject invention.
Figure 12B:
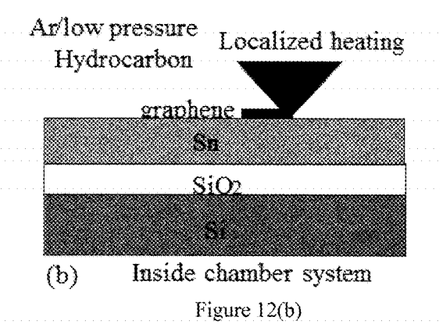
Figure 12C:
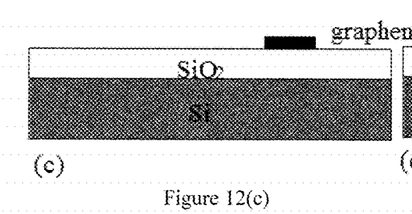
Figure 12D:
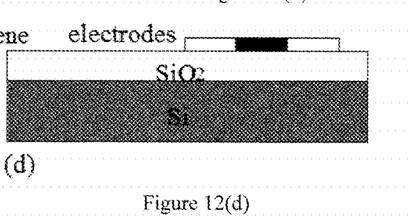

FIG. 11 illustrates a line-rectangle heater in operation. A substrate 1101 is used to grow a graphene sheet 1103 using a heated structure 1199 of any shape. The heated structure 1199 is moved in the XYZ direction as illustrated by the arrows 1107 according to the motion of heated structure 1199.

Apparatuses of embodiments of the subject invention have been described with reference to the figures, including FIG. 1. An apparatus can comprise a tip or tip array being a micromachined cantilever beam(s) with a resistive tip(s) at the distal end of the cantilever beam. Alternatively, the tip or tip array can be a micromachined cantilever beam(s) with a metallic tip at the distal end of the cantilever beam(s) to heat the tip by inductive heating. As yet another alternative, the tip or tip array can be a micromachined cantilever beam(s) with an electrode extending to the tip(s) at the distal end of the cantilever beam. As yet another alternative, a frame can contain a two dimensional array of tips.

The tip or tips may be controlled and used for imaging the structure fabricated. There are a number of techniques and tools that can be used for movement control and view the movement of the tip and the device being fabricated. For example, a photodetector and/or a laser can be used to monitor the movement of the tip or tip array. A piezo-resistive element on the cantilever beam(s) can be used to monitor the tip or tip array movement in relation to the substrate. Alternatively, a piezo-electric element on the cantilever beam(s) can be used to monitor the tip or tip array movement in relation to the substrate. The tip can be a part of a scanning probe microscope, an atomic force microscope, a triangulation meter, a confocal meter, and/or a scanning tunneling microscope. The system can be used in combination with a scanning electron microscope, an optical microscope, and/or an interferometer. The chamber that the tip operates in may contain: a plate with an electrode to place the substrate and apply an electric field between the tip or tip array and the plate; or a plate with two or more electrodes on the sides to apply an electric field in the direction of the plate. The chamber may contain gas pumps for controlling the pressure inside the chamber. A heated plate may be included to place the substrate on and apply specific temperature to the substrate. Coils may be included for applying an AC magnetic field to inductively heat the tip or tip arrays. The chamber can include an inlet and an outlet. A controller for temperature control of the tip or tip array can also be included. A position controller and stage to control the movement of the tip or tip array relative and the substrate relative to each other can be included. One or more precursor gasses can be used. Optionally, at least one of the precursors is a hydrocarbon growth precursor (such as methane) for growing graphene.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of synthesis of graphene, the method comprising:
   preparing a substrate comprising a carbon (C) layer and a catalyst metal layer in a chamber;
   disposing a thermal probe tip on the catalyst metal layer;
   heating the thermal probe tip such that graphene is formed on the substrate; and
   removing the catalyst metal layer from the substrate;
   the C layer being disposed inside the substrate and covered by the catalyst metal layer.

2. The method according to claim 1, wherein the catalyst metal layer is a tin (Sn) layer.

3. The method according to claim 1, the substrate comprising a silicon (Si) layer and an oxide layer on the Si layer, and
   the Si layer, the oxide layer, the C layer, and the catalyst metal layer being stacked in series.

4. The method according to claim 3, further comprising flowing precursor gases.

5. The method according to claim 3, the thermal probe tip having a diameter of submicron length.

6. The method according to claim 3, the heating of the thermal probe tip comprising heating by at least one of a laser, microwave radiation, inductive heating, and resistive heating.

7. The method according to claim 3, further comprising moving the thermal probe tip with respect to the substrate or moving the substrate with respect to the thermal probe tip.

8. The method according to claim 3, further comprising forming an electrode on the graphene.

9. The method according to claim 3, the catalyst metal layer being an Sn layer, and the C layer and the Sn layer being formed on the oxide layer by electron beam evaporation.

10. The method according to claim 3, the catalyst metal layer being an Sn layer, and the removing of the Sn layer comprising using 10% $HNO_3$ solution.

11. The method according to claim 1, the catalyst metal layer being an Sn layer, and the disposing of the thermal probe tip comprising disposing the thermal probe tip in direct physical contact with the Sn layer.

12. The method according to claim 1, a pressure of the chamber being maintained under 1 Torr during the disposing of the thermal probe tip on the catalyst metal layer, the heating of the thermal probe tip, and the removing of the catalyst metal layer from the substrate.

13. A method of synthesis of graphene, the method comprising:
   depositing a carbon (C) layer on a substrate comprising a silicon (Si) layer and an $SiO_2$ layer on the Si layer;
   depositing a tin (Sn) layer on the C layer;
   preparing the substrate including the Si layer, the $SiO_2$ layer, the C layer, and the Sn layer in a chamber;
   maintaining a pressure of the chamber under 1 Torr;
   flowing argon gas in the chamber;
   contacting a thermal probe tip on the Sn layer;
   heating the thermal probe tip to a temperature of greater than 250° C. such that graphene is formed on the substrate; and
   etching the substrate with $HNO_3$ solution.

* * * * *